Figure 1:
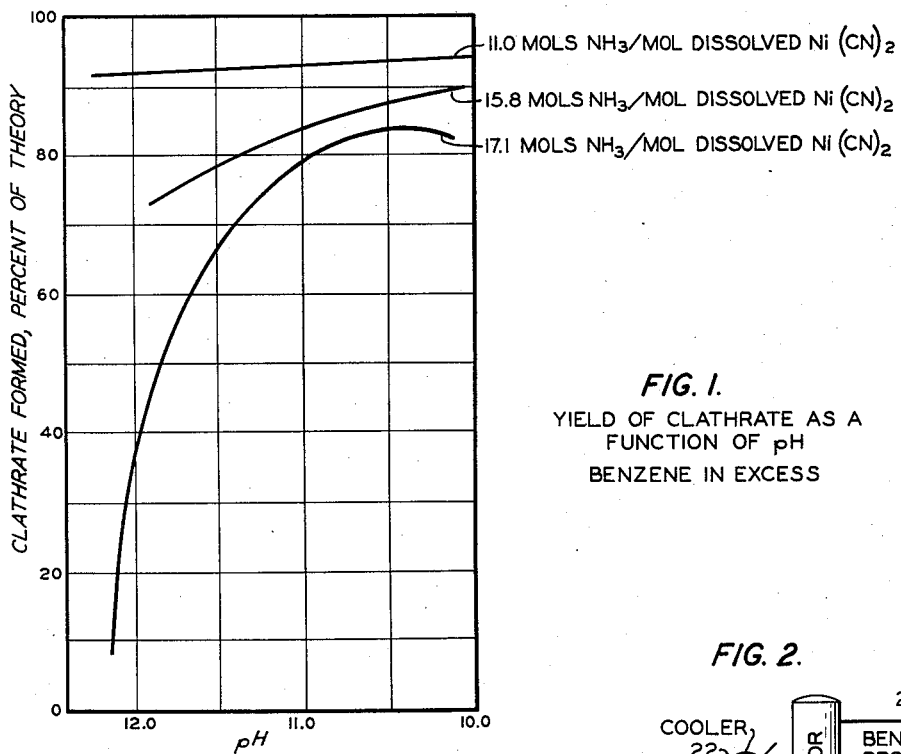

Sept. 22, 1959     G. C. RAY ET AL     2,905,730

METHOD OF FORMING A CLATHRATE COMPLEX

Filed Sept. 2, 1954

YIELD OF CLATHRATE AS A FUNCTION OF pH
BENZENE IN EXCESS

INVENTOR.
G. C. RAY
C. E. SMITH
BY Hudson & Young
ATTORNEYS

United States Patent Office 2,905,730
Patented Sept. 22, 1959

2,905,730

METHOD OF FORMING A CLATHRATE COMPLEX

Gardner C. Ray and Clifford E. Smith, Bartlesville, Okla., assignors to Phillips Petroleum Company, a corporation of Delaware Application September 2, 1954, Serial No. 453,924

4 Claims. (Cl. 260—674)

This invention relates to the purification of certain organic compounds by way of the formation and decomposition of so-called clathrate complexes. In one of its aspects the invention provides a composition for an ammonia-nickel cyanide reagent for reaction with benzene to form said complex which can then be decomposed to recover pure benzene. In another aspect, the invention relates to a method for preparing said composition (with just sufficient ammonia to effect solution of the nickel cyanide, as later described and discussed herein). In still another aspect, the invention relates to the recovery and reuse of the solid decomposition product of the clathrate complex, which is obtained when the complex is decomposed to recover the pure hydrocarbon or compound, by dissolving the solid material obtained in the aqueous phase separated from the mother liquor from which the clathrate complex is obtained and recycling the resulting aqueous ammoniacal nickel cyanide reagent thus formed to the zone in which the benzene or benzene-containing hydrocarbon stream, or other compound, is contacted with the reagent to initially form clathrate complex.

Other aspects, the objects, and the advantages of the invention are apparent from this disclosure, the drawings, and the appended claims.

The formation of a clathrate complex of the formula $Ni(CN)_2 \cdot NH_3 \cdot C_6H_6$ by contacting benzene with an aqueous ammoniacal solution of nickel cyanide is known. The preparation of a nickel cyanide reagent has been described by Evans et al. [J. Chem. Soc. (London) 3346 (1950)] and comprises forming an aqueous ammoniacal solution of nickel cyanide, by the addition of a large amount of ammonium hydroxide and neutralizing the excess ammonia by the addition of acetic acid. The desired neutralization is evidenced by the appearance of a slight turbidity occurring when the nickel cyanide begins to precipitate from the solution. This aqueous ammoniacal solution of nickel cyanide has been used as a reagent for reaction with benzene to form a solid clathrate complex from which benzene of high purity can be recovered by dry distillation. Aniline, phenol, thiophene, furan and pyrrole also form solid complexes.

We have now found that the effectiveness of a reagent of an aqueous ammoniacal solution of nickel cyanide in forming a clathrate complex by reaction with benzene can be improved by having a minimum concentration of free ammonia in the reagent. Also, we have found that the aqueous ammoniacal solution of the reagent should be prepared with an amount of ammonia which is just sufficient to effect solution of the nickel cyanide instead of using an excessive amount of aqueous ammonia and neutralizing the excess ammonia with an acid as disclosed in the prior art. The use of an excessive amount of aqueous ammonia in dissolving the nickel cyanide and neutralizing the excess with an acid results in the formation of a buffer salt of ammonia and the presence of this buffer salt in the solution raises the effective concentration of the free ammonia in the reagent at a specified pH. We have found that an improved aqueous ammoniacal nickel cyanide reagent can be prepared by using a minimum amount of ammonia to dissolve the nickel cyanide so that a minimum amount of no acid is required to neutralize the excessive ammonia present in the reagent. In comparison to the nickel cyanide reagents disclosed in the art, the reagent of this invention effects the formation of the clathrate complex in improved yield and at greatly increased reaction rates. The use of the reagent of this invention permits the separation and/or recovery of benzene from benzene-containing streams in a high state of purity in a high yield and at much higher reaction rates than were previously obtainable.

According to the invention, therefore, there is provided a method for producing a novel clathrate or aqueous ammoniacal nickel cyanide reagent which comprises using just sufficient or substantially only sufficient ammonia to take into solution the nickel cyanide.

The maximum concentration of the cyanide in the reagent is determined by its solubility in the ammoniacal solution. However, any excess cyanide, which can be used, will be present as a slurry and will be dissolved as the clathrate complex formation uses it. Usually, about at least 0.1 and preferably more than 1.0 weight percent of the ammoniacal solution will be nickel cyanide. The solution will usually be at or near saturation with respect to the cyanide.

The concentration of ammonia in the reagent is very critical since a high free ammonia concentration in the reagent is detrimental to the yield and reaction rate in the formation of the clathrate complex. The maximum concentration of ammonia is limited to 16 mols of total ammonia per mol of dissolved nickel cyanide. The minimum concentration of ammonia in a solution-type nickel cyanide reagent is 11.0 mols of total ammonia per mol of dissolved nickel cyanide and a concentration of ammonia greater than 11.0 and less than 16 mols of total ammonia per mol of dissolved nickel cyanide is usually used. A concentration of ammonia less than 11.0 mols of total $NH_3$ can also be used; however, the concentration of ammonia necessary to effect solution of nickel cyanide is approximately 11.0 mols of total ammonia per mol of dissolved nickel cyanide so that a reagent containing less than this amount of ammonia is in the form of a slurry having undissolved nickel cyanide suspended in the solution. The preferred ammonia concentration for a solution type reagent is 11.0 mols of total ammonia per mol of dissolved nickel cyanide.

Any excess ammonia in the reagent can be neutralized by the addition of the solution of an acid, particularly a weak organic acid such as acetic or citric acids, however, the neutralization of the excess ammonia with the acid results in the formation of a buffer salt having a detrimental effect on the reagent. Preferably the concentration of acid in the reagent is less than 1 equivalent of acid per mol of dissolved nickel cyanide. The pH of the reagent is affected by the amount of acid added and in general, the pH of the reagent is in the range of 9.6 to 12.5. A reagent having a pH as low as 7 can be used; however, since the nickel cyanide begins to precipitate at a pH of about 9.6, this reagent contains some undissolved nickel cyanide. The yield of clathrate complex obtained with the reagent of this invention is increased as the pH of the reagent is decreased; however, reagents having the same pH did not give the same yield of clathrate complex unless the original concentrations of ammonia were the same. Thus, a reduction in pH has less effect on the yield of clathrate formed with a reagent containing 11 mols of ammonia per mol of nickel cyanide than a reagent containing 16 mols of ammonia per mol of nickel cyanide. At least about 0.1 weight percent nickel cyanide is present in the reagent of the invention.

The nickel cyanide reagent of this invention may be prepared from either nickel cyanide of commerce or from a mixture of soluble nickel salts and potassium cyanide which forms nickel cyanide in situ. Hydrated nickel chloride or nickel sulfate is very suitable for the preparation of this reagent but other nickel salts which are soluble to some degree in water can also be used.

The preparation of the reagent comprises dissolving 120 grams of nickel chloride hexahydrate in 480 cc. of water, dissolving 70.6 grams of potassium cyanide in 282 cc. of water, mixing the solutions together, adding 350 cc. of 28–30 percent aqueous ammonia, and adding water to make the total volume 1500 cc. If desired, acetic acid can then be carefully added to reduce the pH to the desired level.

The nickel cyanide reagent of this invention reacts with benzene to give the $Ni(CN)_2 \cdot NH_3 \cdot C_6H_6$ clathrate in good yield and at a high reaction rate. Since this reaction is selective to benzene and the clathrate is decomposable by heat to yield substantially pure benzene, benzene can be recovered in good yield and in an exceptionally high state of purity from difficultly separable benzene-containing streams. For example, benzene can be recovered from cracked hydrocarbon streams containing olefins and diolefins or from natural gasoline fractions which either form azeotropes with benzene or boil so close to benzene that effective separation by fractional distillation is not possible.

The clathrate complex is formed by contacting the nickel cyanide reagent with the benzene-containing stream under conditions of temperature ordinarily in the range of 0–40 C., pressure ordinarily in the range of atmospheric to 10 p.s.i.g., and nickel cyanide/benzene ratio ordinarily in the range of 1:1 to 5:1. The clathrate produced decomposes at a temperature in the range of 125–200 C. at ordinary pressure.

Figure 2:
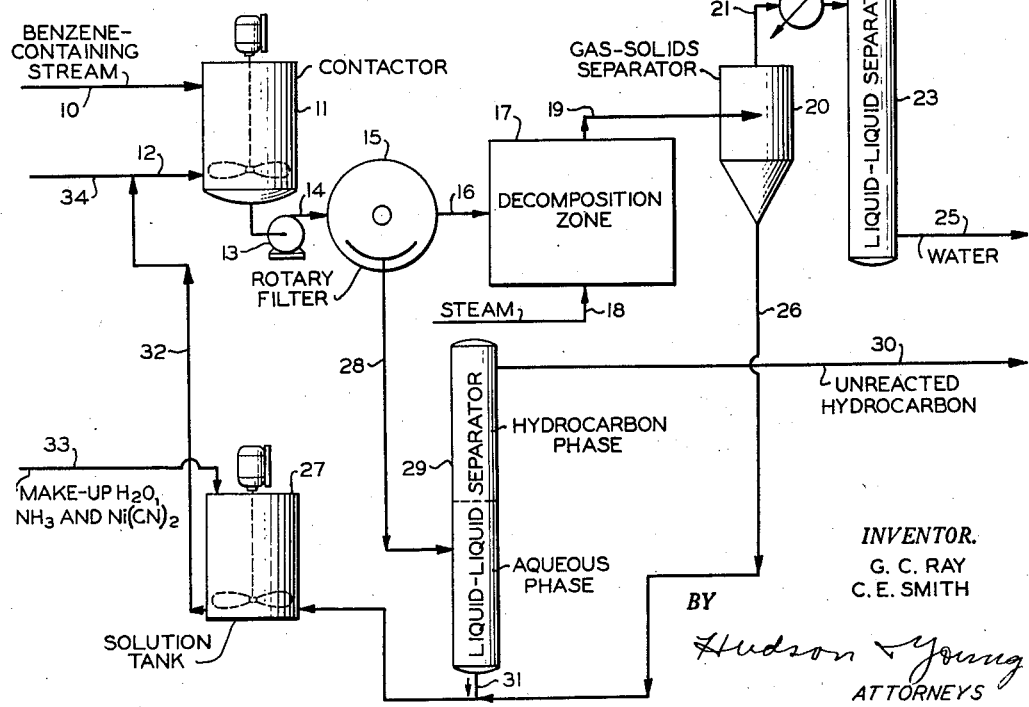

The drawings show in Figure 1 a series of curves plotted by determining yield of clathrate as a function of pH and in Figure 2 a schematical illustration of a modus operandi embodying the several related inventions herein described.

Referring now to Figure 1, it will be observed that while with 17.1 mols of ammonia followed by neutralization, a maximum of 83 percent of clathrate was formed at a pH of 11.5, at pH's of from 10 to 12.5 with 11 mols of ammonia without neutralization at all times in excess of 90 percent (92 to about 93.5 percent) yield of clathrate was obtained.

This illustrates clearly the advantage of that feature of the present inventions which comprises limiting the quantity of ammonia, as described.

EXAMPLE I

An aqueous ammoniacal nickel cyanide reagent was prepared from nickel chloride hexahydrate and potassium cyanide in the manner previously disclosed with varying quantities of ammonia and glacial acetic acid added. The various nickel cyanide reagents were contacted in an amount of 350 cc. of reagent with 15 cc. of benzene at a temperature of 27 C. for a period of one hour. The data obtained are given in Table I and are shown in Figure 1. These data show the yield advantages obtained when a minimum amount of ammonia is used to prepare the reagent. In the table, the reagents of the test having ammonia/nickel cyanide mol ratios of 17.1 at a final pH of 12.10 and 11.0 at a final pH of 11.90 were made without the addition of acetic acid and very clearly show the substantial increase in yield obtained by using a minimum amount of ammonia in preparing the reagent. The lower curve in the drawing is for a reagent prepared with an ammonia/nickel cyanide mol ratio of 17.1 (Evans reagent) and shows that, when used, the neutralization of the excess ammonia by the addition of acetic acid improves the yield of clathrate formed considerably; however, the yield obtained with this neutralized reagent never becomes as high as the yield obtained with the reagent prepared with a minimum amount of ammonia.

The specific rate constants for the formation of the clathrate complex were determined at a pH of 10.55 and at a temperature of 25 C. with nickel cyanide reagents of 0.35 molarity with respect to nickel and prepared with varying amounts of ammonia. The reagent prepared with 17.1 mols of ammonia per mol of nickel cyanide (Evans reagent) had a reaction rate constant of 0.075 min.$^{-1}$ whereas the reaction rate constant for a reagent containing 15.8 mols ammonia per mol nickel cyanide was 0.230 min.$^{-1}$

*Table I*

| Ammonia/nickel cyanide, mol ratio | pH of reaction mixture | | Yield of clathrate, percent of theory based on nickel cyanide |
|---|---|---|---|
| | Initial | Final | |
| 17.1 | 12.00 | 12.10 | 11.4 |
| 17.1 | 11.00 | 11.15 | 76.0 |
| 17.1 | 10.00 | 10.35 | 83.0 |
| 15.8 | 11.50 | 11.65 | 76.6 |
| 15.8 | 10.70 | 10.95 | 84.2 |
| 15.8 | 10.30 | 10.60 | 87.0 |
| 15.8 | 9.8 | 10.15 | 89.5 |
| 11.0 | 11.90 | 11.90 | 91.7 |
| 11.0 | 11.00 | 11.45 | 93.1 |

EXAMPLE II 200 cc. of ammoniacal nickel cyanide reagent containing 11 mols ammonia per mol dissolved nickel cyanide, 0.35 molar with respect to nickel cyanide, and having a pH of 12 was contacted at 25 C. with 50 cc. of a 3 liquid volume percent benzene–97 liquid volume percent n-heptane mixture until equilibrium was reached. The benzene content of the hydrocarbon phase was thus reduced to 1.3 liquid volume percent. This corresponds to a clathrate yield of 56.6 percent of theory. Repeating this experiment at 6 C. instead of 25 C. gave a hydrocarbon phase containing 0.855 liquid volume percent benzene, corresponding to a clathrate yield of 71.6 percent of theory. The molar ratio of nickel cyanide to benzene used in this example was approximately 4:1.

EXAMPLE III 250 cc. of ammoniacal nickel cyanide containing 17 mols ammonia per mol dissolved nickel cyanide (the Evans reagent) and 0.35 molar with respect to nickel cyanide was contacted at 6 C. with 75 cc. of a 2.85 liquid volume percent benzene–97.15 liquid volume percent n-heptane mixture until equilibrium was reached. A clathrate yield of 46 percent of theory was obtained. The molar ratio of nickel cyanide to benzene used in this example was approximately 3.6:1.

EXAMPLE IV 300 cc. of the ammoniacal nickel cyanide reagent described in Example I was contacted with 20 cc. of a 30 liquid volume percent–70 liquid volume percent n-heptane mixture at 25 C. until equilibrium was reached. The benzene content of the hydrocarbon phase was reduced to 2.1 liquid volume percent, corresponding to a clathrate yield of 95 percent of theory. The molar ratio of nickel cyanide to benzene in this example was approximately 1.5:1.

EXAMPLE V 750 cc. of the ammoniacal nickel cyanide reagent described in Example II (the Evans reagent) was contacted at 25 C. with 40 cc. of an aromatic fraction obtained as a by-product from commercial scale cracking of n-butane. This material contained 30.5 liquid volume percent benzene as determined by independent analysis. A clathrate yield of 83 percent of theory was obtained after sufficient contact time to reach equilibrium. Upon thermal treatment of the clathrate, benzene was recovered in a purity in excess of 99 percent. The molar ratio of nickel cyanide to benzene used in this example was approximately 1.9:1.

It will be noted that a comparison of Example II with Example III and Example IV with Example V shows that the new reagent disclosed in this case results in an improved yield of clathrate complex over the Evans reagent in the recovery of benzene from dilute streams and that an excess of nickel cyanide reagent can be used.

EXAMPLE VI

The yield and selectivity of an aqueous ammoniacal nickel cyanide reagent for the separation or recovery of benzene from a debutanized aromatic concentrate recovered from the gaseous effluent of a tube type cracking process was determined. A 40 cc. sample of this material, which comprises about 30.5 liquid volume percent benzene, 20 percent $C_5$ olefins and diolefins, 10 percent toluene, 20 percent dicyclopentadiene, and about 20 percent intermediate and higher boiling hydrocarbons, was agitated for one hour at 25 C. with a nickel cyanide reagent containing 17.1 mols of ammonia per mol of dissolved nickel cyanide. The clathrate complex formed amounted to 23.5 grams which corresponds to a yield of 83 percent based on the amount of benzene charged. A 22.56 gram sample of the clathrate complex thus formed was thermally decomposed in a 50 cc. distillation flask, immersed in an oil bath maintained at a temperature of 190-210 C. A stream of nitrogen was passed through the distillation flask and the temperature in the distillation flask was in the range of 125-200 C. The benzene distilled overhead was condensed in a trap cooled in a Dry Ice bath and amounted to 7.42 grams which corresponds to a yield of 87 percent based on the benzene contained in the clathrate complex. The freezing point of the recovered benzene was found to be 5.05 C., corresponding to a purity of 99 plus mol percent.

As noted, also according to the invention, there is provided a process for the recovery and reuse of the solid decomposition product of the compound-clathrate complex which comprises dissolving the solid material obtained in the aqueous phase separated from the mother liquor from which the clathrate complex is obtained and recycling the resulting aqueous ammoniacal nickel cyanide reagent thus formed to the zone in which the benzene or benzene-containing hydrocarbon stream, or other compound, is contacted with the reagent to initially form clathrate complex.

Thus, the present invention relates to a continuous process for the separation and/or recovery of benzene and other compounds which form clathrate complexes, as described herein, from streams containing said compounds using an aqueous ammoniacal nickel cyanide reagent, said process comprising contacting the compound-containing stream with the reagent for a sufficient period of time to form a solid clathrate complex, separating the solid clathrate complex from the mother liquor, decomposing the solid clathrate complex and obtaining a benzene product of high purity, separating the aqueous and hydrocarbon phases of the mother liquor and recovering the unreacted hydrocarbon phase, redissolving the solid material resulting from the decomposition of the clathrate complex in the aqueous phase separated from the mother liquor, and recycling the aqueous ammoniacal nickel cyanide reagent thus formed to the contacting zone.

In the various processes of converting hydrocarbons, there will frequently be formed mixtures of hydrocarbons having closely related properties and these mixtures are difficult to separate into specific components by the usual separation procedures such as fractionation and distillation, liquid-liquid extraction, or the like. This is especially true, for example, of the hexane fraction of a natural gasoline stream in which benzene is often found in a proportion of 97 percent hexane-3 percent benzene corresponding approximately to the composition of the n-hexane-benzene azeotrope. Also, the manufacture of a low boiling olefin-rich stream for utilization in alkylation processes produces a by-product stream containing about 30 volume percent benzene and minor proportions of olefins and diolefins such as 2,4-hexadiene, 3-methyl-2,4-pentadiene and the like, having boiling points very close to the boiling point of benzene. The effective utilization of these streams very often necessitates that either the benzene component be removed from the stream or that the benzene be recovered from the stream in a substantially pure form. Thus, a n-hexane fraction to be isomerized to isohexane with Friedel-Crafts type catalyst must be substantially free of benzene in order to prevent excessive consumption of the catalyst in the conversion process.

The present invention provides a process for the separation and/or recovery of benzene from benzene-containing streams in a high yield and in a high state of purity. The process of this invention can be employed in place of the usual separation processes to separate and recover benzene from readily separable benzene-containing mixtures, but the process of this invention is particularly valuable for effecting the separation and/or recovery of benzene from components that form azeotropic mixtures with benzene or which boil in the benzene boiling range.

In a specific embodiment, the process of this invention comprises contacting the benzene-containing stream with an aqueous ammoniacal nickel cyanide reagent for a sufficient period of time to form a solid clathrate complex, separating the solid clathrate complex from the mother liquor, decomposing the solid clathrate complex and recovering a benzene product of high purity, separating the aqueous and hydrocarbon phases of the mother liquor and recovering the unreacted hydrocarbon phase, redissolving the solid material resulting from the decomposition of the clathrate complex in the aqueous phase separated from the mother liquor and recycling the aqueous ammoniacal nickel cyanide reagent thus formed to the contacting zone. Although the reaction is known, the practical utilization of this reaction to separate and recover benzene from benzene-containing streams has become effective only with the present discovery that the clathrate complex can be decomposed in such a manner as not to evolve ammonia and the solid material resulting from the decomposition step can be dissolved in water or the aqueous mother liquor and recycled to the reaction zone for reaction with additional benzene. Although this process is designed as a continuous operation process and this continuous process is now preferred, the process of this invention can also be performed batchwise in a manner which will be evident to one skilled in the art in possession of this disclosure.

The aqueous ammoniacal nickel cyanide reagent which is described by Evans et al. [J. Chem. Soc. (London), 3346 (1950)] can be employed in the process of this invention. A composition for an improved nickel cyanide reagent has been described herein. The process of this invention is not limited to either of these aqueous ammoniacal nickel cyanide reagents and either of these reagents can be used.

The reaction of aqueous ammoniacal nickel cyanide reagents in benzene is usually conducted at a temperature in the range of 0-40 C. and the highest yields of clathrate complex are obtained in the lower range of temperatures. A pressure in the range of 0-10 p.s.i.g. is maintained in the reaction zone and a contact time in the range of 10–60 minutes is usually necessary to effect substantial reaction of the reagent and benzene. A mol ratio of nickel cyanide to benzene in the range of 1:1 to 5:1 is maintained in the reaction zone.

According to the invention, the decomposition of the clathrate complex can be accomplished either by heating the complex to a slightly elevated temperature or by admixing acids or ammonia with the complex. The preferred method of decomposing the clathrate according to the invention involves heating the material to a temperature in the range of 125–200 C. The uncontrolled heating of the clathrate results in the liberation of ammonia as well as benzene so that the duration of the heating period must be carefully regulated to liberate only benzene. A heating period in the range of 5–30 minutes is ordinarily used and the actual length of the heating period is determined by the temperature employed. Thus, essentially complete benzene recovery is achieved at 30 minutes at 125 C. or in 5 minutes at 180 C. without substantial loss of ammonia. At temperatures much above 200 C. (such as 240 C.) ammonia is liberated at an appreciable rate. Benzene is liberated at room temperatures so that temperatures below 125 C. can also be used. The decomposition of the clathrate complex can be effected simply by heating the material in an ordinary still, however, it is more preferable to use a rotary kiln or to fluidize the solid in a stream of hot carrier gas such as steam, flue gas, butane or the like.

Referring now to the diagrammatic flow of one embodiment of this invention as shown in Figure 2, the benzene-containing stream is fed by line 10 to contacting zone 11 where this feed stream is contacted with an aqueous ammoniacal nickel cyanide solution supplied by line 12. The contacting of these two streams may be effected by mechanical rockers, shakers, centrifugal pumps, stirred autoclaves, or the like. A small amount of a perfluorocarboxylic acid such as perfluorocaproic acid can be added to this contactor to minimize emulsion formation. The amount of perfluorocaproic acid added usually amounts to 0.01 to 0.05 weight percent of the reaction mixture. Thus, 0.01 weight percent of perfluorocaproic acid will minimize emulsion formation. The reactor effluent comprises solid clathrate complex and mother liquor and is passed by slurry pump 13 through line 14 to rotary filter 15 where the solid clathrate complex is separated from the mother liquor.

The solid clathrate complex separated by filter 15 passes by line 16 to decomposition zone 17 to be contacted by steam entering through line 18 and benzene and the resulting solid material passes by line 19 to the gas-solid separator 20. The decomposition of the clathrate complex can be performed in a rotary kiln, an ordinary still, or by fluidizing the clathrate complex in the stream of steam. The vapor stream, comprising steam and benzene, passes by line 21 to cooler 22 and then to liquid-liquid separator 23 from which the benzene product in 99 percent purity is recovered by line 24 and the condensed steam is discarded through line 25.

The solid material separated from gas-solid separator 20 is passed by line 26 to solution tank 27. The mother liquor separated from the clathrate complex by filter 15 passes by line 28 to liquid-liquid separator 29 where the aqueous phase is separated from the hydrocarbon-rich phase. The unreacted hydrocarbon is recovered from separator 29 by line 30 and the aqueous phase, which contains some unreacted ammoniacal nickel cyanide reagent, is passed to solution tank 27 by line 31. In solution tank 27, solid material recovered from gas-solid separator 20 is redissolved in the aqueous phase separated by separator 29 to form the aqueous ammoniacal nickel cyanide reagent which is recycled to contactor 11 by line 32 and line 12 to react with benzene in the benzene-containing stream supplied by line 10. Additional water, ammonia or nickel cyanide which may be required to replace the mechanical loss of any of these components in the process is added to solution tank 27 by line 33. Makeup aqueous ammoniacal nickel cyanide reagent is supplied by line 34 through line 12 to contactor 11.

Reasonable variation and modification are possible within the scope of the foregoing disclosure, drawing, and the appended claims to the invention, the essence of which is that an improved ammoniacal nickel cyanide reagent has been set forth, as described, and that there has been provided a process, which can be continuous, for the recovery and reuse of the decomposition product of clathrates formed with said reagent or other reagents forming clathrates, as described, with the compounds also as described.

We claim:

1. A method of forming a clathrate complex of a compound which forms a clathrate complex which comprises contacting a material comprising said compound and a non-clathratable compound with a reagent comprising nickel cyanide, ammonia and water, the said reagent being prepared by contacting water and nickel cyanide in desired proportions, with substantially only sufficient ammonia, 11.0 mols ammonia per mol of nickel cyanide, to dissolve the nickel cyanide and without any subsequent neutralization.

2. A method of forming a clathrate complex of a compound which forms a clathrate complex which comprises admixing together nickel cyanide and water and adding sufficient ammonia, 11.0 mols ammonia per mol of nickel cyanide, to substantially completely dissolve the nickel cyanide but without any subsequent neutralization of free ammonia and then contacting a material comprising said compound and a non-clathratable compound with the reagent thus prepared.

3. A method of forming a clathrate complex of benzene which comprises admixing together nickel cyanide and water and adding sufficient ammonia, 11.0 mols ammonia per mol of nickel cyanide, to substantially completely dissolve the nickel cyanide and without any subsequent neutralization of free ammonia and then contacting a material comprising said benzene and a non-clathratable compound with the reagent thus prepared.

4. A process for the separation of benzene from a benzene-containing material also containing a non-clathratable compound by formation of a benzene-clathrate complex with an aqueous ammoniacal nickel cyanide clathrate-forming reagent which comprises forming said reagent employing approximately only that quantity of ammonia, 11.0 mols ammonia per mol of nickel cyanide, which is required to dissolve into the aqueous reagent the nickel cyanide which is to be present therein in solution form, directly contacting said benzene-containing material with the reagent, without any neutralization of said reagent, thus formed to obtain a solid clathrate complex, separating said solid complex from a mother liquor thus formed, decomposing said clathrate to obtain benzene therefrom and a solid residue, separating said mother liquor into a hydrocarbon phase and into an aqueous phase, admixing solid residue, as above obtained, with said aqueous phase, and returning said aqueous phase to the step, above defined, in which the benzene-containing stream is contacted with said nickel cyanide-containing reagent.

References Cited in the file of this patent

UNITED STATES PATENTS

| | | |
|---|---|---|
| 1,328,938 | Williams | Jan. 27, 1930 |
| 2,596,344 | Newey et al. | May 13, 1952 |
| 2,627,513 | Arey | Feb. 3, 1953 |
| 2,652,435 | Hess et al. | Sept. 15, 1953 |
| 2,673,195 | Busso et al. | Mar. 23, 1954 |
| 2,681,335 | Gorin | June 15, 1954 |

(Other references on following page)

UNITED STATES PATENTS

| | | |
|---|---|---|
| 2,732,413 | Jones et al. | Jan. 24, 1956 |
| 2,837,466 | Van Eck | June 3, 1958 |

OTHER REFERENCES

Dennis et al.: "Gas Analysis," The Macmillan Co. (1929), pages 337–341.

Gas Engineers Handbook, McGraw-Hill Book Co., New York, First Ed. (1934), page 118.

Hal'pern: Bull. Acad. Sci., U.R.S.S. Classe Sci. Math. Wat. Ser. Chim. (1937), pages 435–41. Abstracted in Chem. Abs., vol. 31, (1937).

Powell: Jour. Chem. Soc. (London), 1948, pages 61–73.

Evans et al.: Jour. Chem. Soc. (London), 1950, page 3346.

Merck Index, 6th ed. (1952), Merck & Co., Rahway, New Jersey, page 672.